United States Patent [19]

Davies et al.

[11] Patent Number: 5,410,882
[45] Date of Patent: May 2, 1995

[54] COMPRESSION RELEASE ENGINE BRAKING SYSTEMS

[75] Inventors: Gregory T. H. Davies, Suffield; Dennis R. Custer, West Granby, both of Conn.

[73] Assignee: Jacobs Brake Technology Corporation, Wilmington, Del.

[21] Appl. No.: 112,769

[22] Filed: Aug. 26, 1993

[51] Int. Cl.[6] .......................................... F02B 37/00
[52] U.S. Cl. ................................................. 60/602
[58] Field of Search ...................... 60/602, 605.1, 611

[56] References Cited

U.S. PATENT DOCUMENTS

| | | |
|---|---|---|
| 3,220,392 | 11/1965 | Cummins . |
| 4,688,384 | 8/1987 | Pearman et al. ............. 60/600 |
| 4,848,289 | 7/1989 | Meneely . |
| 4,856,463 | 8/1989 | Johnston ...................... 60/602 |

FOREIGN PATENT DOCUMENTS

| | | | |
|---|---|---|---|
| 588160 | 12/1959 | Canada ................................... | 60/602 |
| 55-84818 | 6/1980 | Japan .................................... | 60/602 |
| 57-56625 | 4/1982 | Japan .................................... | 60/602 |
| 57-140523 | 8/1982 | Japan .................................... | 60/602 |

*Primary Examiner*—Michael Koczo
*Attorney, Agent, or Firm*—Fish & Neave; Robert R. Jackson

[57] ABSTRACT

In a compression release engine braking system for a turbocharged internal combustion engine, excessive stress associated with opening the exhaust valves of the engine near top dead center of engine compression strokes when the engine is turning at high speed is prevented by reducing the intake manifold pressure from what it otherwise would be at that high speed. This is done by retarding the turbocharger so that its speed is less than it otherwise would be at high engine speed. Turbocharger retarding can be accomplished in any of several ways such as by restricting the flow of engine exhaust gas to or from the turbocharger, or by allowing a portion of the exhaust gas to bypass the turbocharger.

7 Claims, 8 Drawing Sheets

COMPRESSION RELEASE ENGINE BRAKING SYSTEMS

BACKGROUND OF THE INVENTION

This invention relates to compression release engine braking systems for turbocharged internal combustion engines, and more particularly to such systems in which increased braking horsepower can be provided at low and moderate engine speeds without unacceptably high stress on components of the engine and engine brake at high engine speeds.

Compression release engine brakes for internal combustion engines are well known as shown, for example, by Cummins U.S. Pat. No. 3,220,392. The purpose of such brakes is to convert the associated engine from a power source to a power sink when braking is desired. Such power sinking may be helpful to assist the wheel brakes of a vehicle (e.g., a tractor trailer truck) propelled by the engine, thereby prolonging the life of the wheel brakes and increasing the safety of operation of the vehicle. When engine braking is desired, the flow of fuel to the engine is cut off and the engine brake is turned on. Turning on the engine brake causes it to open at least one exhaust valve in at least one engine cylinder (preferably several or all engine cylinders) each time the piston in that cylinder nears top dead center of its compression stroke. This releases to the exhaust manifold of the engine the gas compressed in the cylinder and prevents the work done in compressing that gas from being recovered in the subsequent "power" stroke of the piston. The engine therefore dissipates the work of compressing the gas thus exhausted, and that dissipated work brakes the engine and the associated vehicle. In effect, the engine brake temporarily converts the engine to a gas compressor in order to make the engine absorb work or energy.

The typical compression release engine brake opens exhaust valves in the associated engine as described above by picking up an appropriately timed motion from another part of the engine and transmitting that motion to the exhaust valve or valves to be opened. For example, a fuel injector pushtube of one cylinder may be in motion when the engine brake needs to open the exhaust valve or valves of another cylinder. The engine brake may therefore be provided with a hydraulic circuit between a master piston operated by the fuel injector pushtube mechanism and a slave piston which operates on the exhaust valve mechanism. When the engine brake is turned on, this hydraulic circuit is sealed so that a fuel injector input to the master piston is transmitted to the slave piston, thereby causing the slave piston to open the associated exhaust valve or valves at the proper time.

If the engine associated with an engine brake is turbocharged, the force required from the engine brake to open the exhaust valves of the engine near top dead center of its compression strokes tends to increase substantially as engine speed increases and turbocharger effectiveness increases accordingly. A turbocharger uses the exhaust gases of the engine to spin a turbine. The turbine powers a rotary pump for forcing more gas into the intake manifold and cylinders of the engine. This increases the gas pressure in the cylinders, thereby increasing the force required to open the exhaust valves near top dead center of a compression stroke. A turbocharger has relatively little effect on the associated engine at low engine speed, but its effect increases substantially at higher engine speeds. When the engine is operating at high speed and the associated turbocharger is therefore highly effective, the force required from the engine brake in order to open the exhaust valves may become unacceptably high. For example, the load on the push-tube mechanism may exceed the load allowed on that mechanism by the engine manufacturer. This has typically necessitated adjusting the timing of the engine brake so that it does not attempt to open the exhaust valves so close to top dead center. However, this tends to reduce the effectiveness of the engine brake. Moreover, this reduction in engine brake effectiveness occurs at all engine speeds, even though the problem of unacceptably high loads or stresses only occurs at relatively high engine speeds.

In view of the foregoing, it is an object of this invention to provide compression release engine braking systems for turbocharged engines which provide increased engine brake effectiveness at low and moderate engine speeds without producing unacceptably high stresses at high engine speeds.

It is another object of this invention to provide compression release engine braking methods and apparatus which increase the engine braking available at low and moderate speeds without causing unacceptably high stresses in the engine or engine brake at higher engine speeds.

SUMMARY OF THE INVENTION

These and other objects of the invention are accomplished in accordance with the principles of the invention by providing compression release engine braking systems for turbocharged engines in which an indicator of engine speed is monitored. For example, engine speed may be monitored directly by a tachometer. Alternatively, intake manifold pressure may be monitored because intake manifold pressure tends to increase with engine speed due to increased turbocharger effectiveness at higher engine speeds. When the engine speed parameter or indicator reaches a predetermined threshold level, any further increase in intake manifold pressure due to still greater engine speed is substantially prevented by preventing any substantial further increase in turbocharger speed. This retarding of the turbocharger can be accomplished in any of several ways. For example, the flow of exhaust gas to or from the turbocharger can be somewhat reduced (e.g., by a flow restrictor or by a diverter which diverts some of the exhaust gas around the turbocharger). Preventing substantial further increase in turbocharger speed prevents substantial further increase in intake manifold pressure. This in turn prevents substantial further increase in the force required to open the exhaust valves in the engine when the speed of the engine becomes relatively high. The timing of the engine brake can therefore be set to deliver substantially increased braking horsepower at low and moderate engine speeds without risk that excessively high stresses will result when engine speed is higher.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
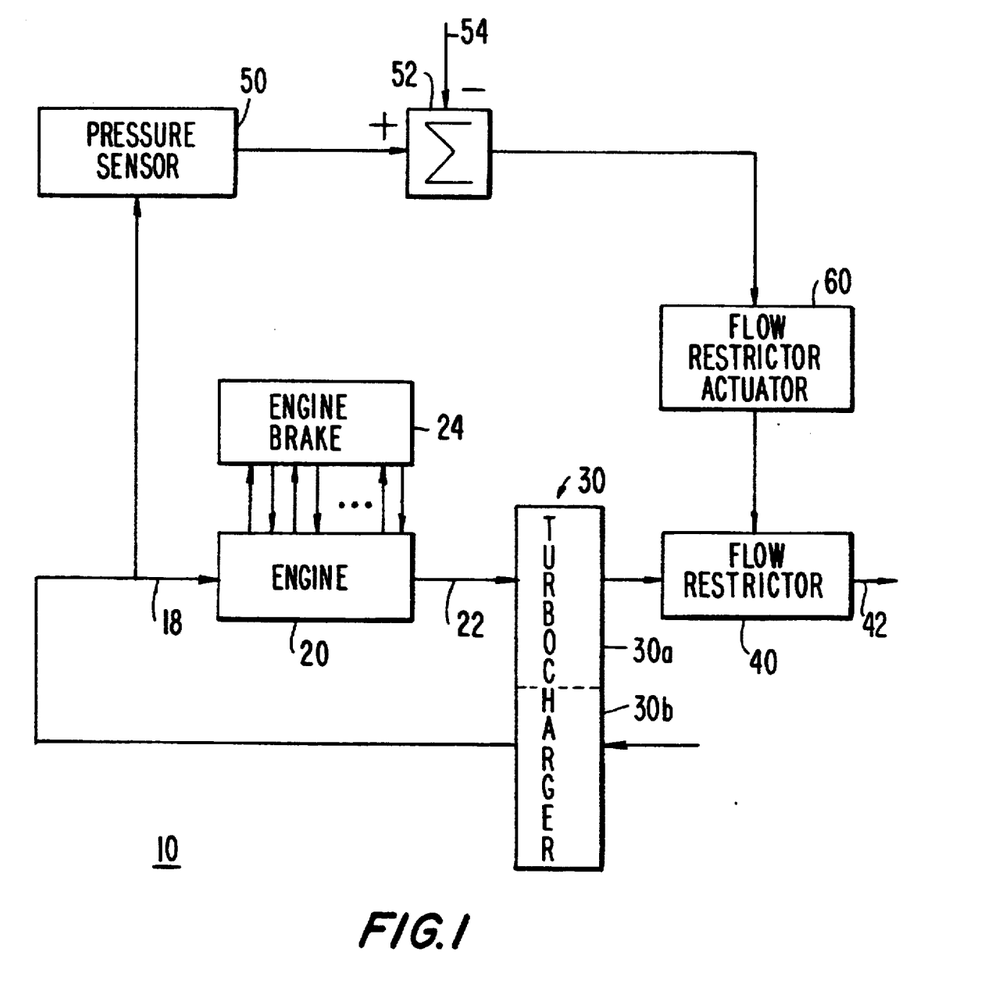
FIG. 1 is a block diagram of an illustrative compression release engine braking system constructed in accordance with the principles of this invention.

As shown in FIG. 1, an illustrative compression release engine braking system 10 constructed in accordance with the principles of this invention includes conventional internal combustion engine 20 having an intake manifold 18, an exhaust manifold 22, and a conventional compression release engine brake 24. Exhaust manifold 22 conveys engine exhaust gas to the turbine portion 30a of conventional turbocharger 30. The turbine of turbocharger 30 rotates a gas pump in the pump portion 30b of the turbocharger in order to increase the pressure of the gas in intake manifold 18. Exhaust gas leaving turbocharger turbine 30a flows through variable flow restrictor 40 and exits from the system via exhaust pipe 42.

Flow restrictor 40 may be any of several types of devices for selectively somewhat restricting the flow of exhaust gas from turbocharger turbine 30a. For example, flow restrictor 40 may be a butterfly valve or a gate valve for partly obstructing the flow of exhaust gas through it. Thus flow restrictor 40 may be somewhat like a conventional exhaust brake of the type shown, for example, in Meneely U.S. Pat. No. 4,848,289, but it has typically not been found necessary in connection with the present invention to close flow restrictor 40 to the degree that it functions significantly as an exhaust brake. Rather, as will be explained in more detail below, in the present invention flow restrictor 40 is only typically closed to the extent required to retard or slow down turbocharger turbine 30a at relatively high engine speeds. Even a relatively small increase (e.g., a 4 p.s.i. increase) in exhaust gas pressure produced by flow restrictor 40 may be sufficient to retard turbocharger turbine 30a in accordance with this invention.

In accordance with the present invention, the extent to which flow restrictor 40 is closed during engine braking is determined by the speed of engine 20. In the embodiment shown in FIG. 1 engine speed is monitored by pressure sensor 50, which monitors the pressure of the gas in intake manifold 18. Intake manifold gas pressure is an indicator of engine speed because the effect of turbocharger 30 is to substantially increase intake manifold pressure as engine speed increases.

Pressure sensor 50 produces an output signal which is one input to comparator 52. The other input to comparator 52 is a predetermined reference signal 54 which is indicative of a threshold intake manifold pressure (and therefore a threshold engine speed) at which flow restrictor 40 should begin to restrict exhaust gas flow in order to suppress further increases in turbocharger effectiveness (i.e., speed) due to any further increase in engine speed. For example, comparator 52 may continuously subtract reference signal 54 from the output signal of pressure sensor 50 and apply to flow restrictor actuator 60 a signal indicative of the result of this subtraction. As soon as the signal applied to actuator 60 becomes positive, actuator 60 begins to close flow restrictor 40, thereby suppressing the response of turbocharger 30 to further increases in the speed of engine 20. In other words, closing flow restrictor 40 reduces the speed of turbocharger 30 from what it otherwise would be if flow restrictor 40 was fully open or not present.

Figure 2:
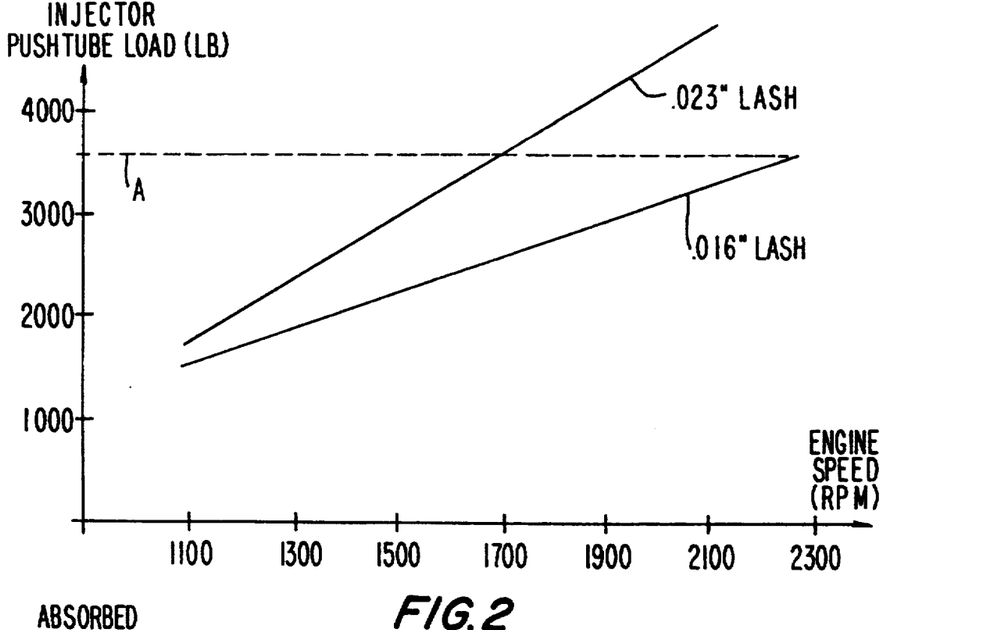
FIGS. 2 and 3 are graphs showing certain operating parameters of illustrative compression release engine braking systems constructed without the benefit of this invention.
Figure 3:
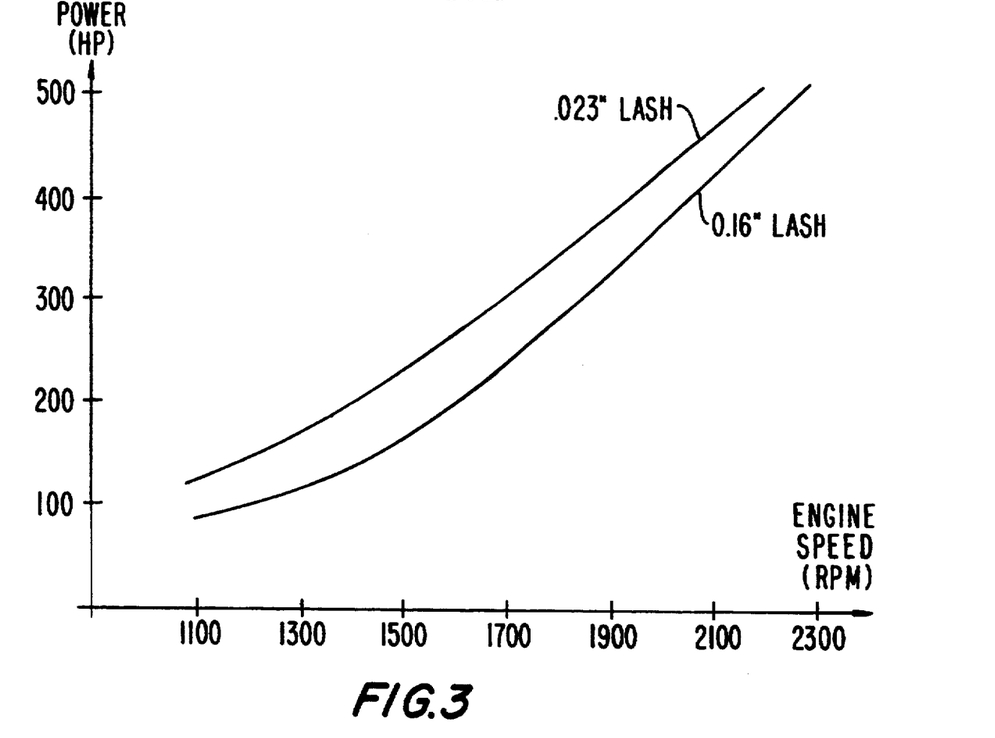

FIGS. 2 and 3 illustrate the motivation for the present invention. Both of these FIGS. show typical performance data without the present invention. In FIG. 2 the load imposed by engine brake 24 on the fuel injector pushtubes of engine 20 is shown as a function of engine speed for two different timing settings of engine brake 24. The upper curve in FIG. 2 relates to setting engine brake 24 with a "lash" of 0.023 inches. (The engine brake lash is the "at rest", "cold engine" clearance between each slave piston and the portion of the exhaust valve mechanism operated on by the slave piston when the engine brake is on.) This relatively large clearance delays exhaust valve opening until closer to top dead center of the compression stroke than the smaller 0.016 inch lash of the lower curve in FIG. 2.

Because exhaust valve opening occurs closer to top dead center with the 0.023 inch lash setting, the gas pressure in the associated engine cylinder is higher for the 0.023 inch setting. This in turn means that the load on the engine brake and engine components involved in opening the exhaust valves is higher for the 0.023 inch setting. In the particular engine and engine brake combination to which FIG. 2 applies, the limiting factor is the permissible load on the fuel injector pushtubes in the engine. As indicated by the broken line A in FIG. 2, the engine manufacturer has specified that fuel injector pushtube load should not exceed 3600 pounds. As FIG. 2 shows, this limit is exceeded with the 0.023 inch lash setting whenever engine speed is above about 1700 RPM. The 0.023 inch setting therefore cannot be used in the absence of the present invention, even though FIG. 3 shows that it would be highly desirable to do so because it produces substantially more engine braking horsepower than the 0.016 inch lash setting. Despite the lower engine braking horsepower produced, the 0.016 inch lash setting must be used (in the absence of this invention) in order to ensure that fuel injector pushtube load limit A is not exceeded at any engine speed for which the engine is rated. FIG. 3 shows, for example, that about 23% more braking horsepower would be available at 1700 RPM if the 0.023 inch lash setting rather than the 0.016 inch lash setting could be used. However, in the absence of the present invention it is not safe for engine 20 to set engine brake 24 with 0.023 inch lash because (as FIG. 2 shows) that leads to unacceptably high loads on the fuel injector pushtubes in engine 20 at speeds above 1700 RPM.

Figure 4:
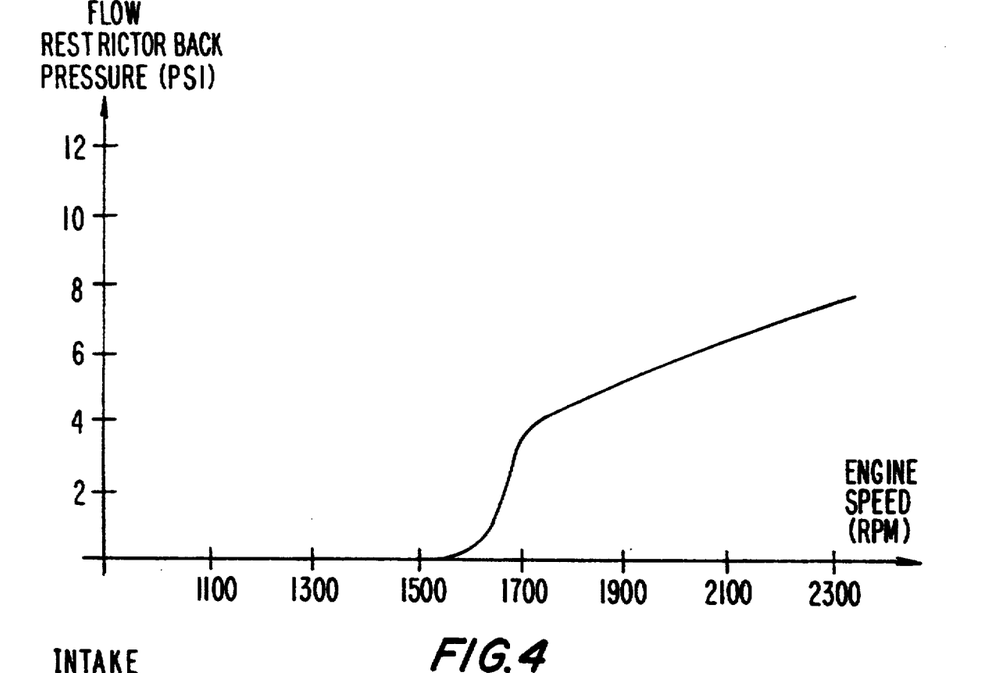
FIGS. 4–7 are graphs of certain operating parameters of the system of FIG. 1.

In accordance with the present invention as illustrated in FIG. 1, lash settings (like the 0.023 inch setting described above) that produce more engine braking at low and moderate engine speeds can be used without exceeding stress limits at higher engine speeds by closing flow restrictor 40 when engine 20 is in the relatively high speed range that would otherwise cause the above-mentioned stress limits to be exceeded. FIG. 4, for example, illustrates typical backpressure produced by flow restrictor 40 as a function of engine speed in accordance with this invention. (The backpressure values specified in FIG. 4 are pressures in excess of what the pressure would be at the same point in the system without flow restrictor 40 or with flow restrictor 40 fully open.)

Figure 5:
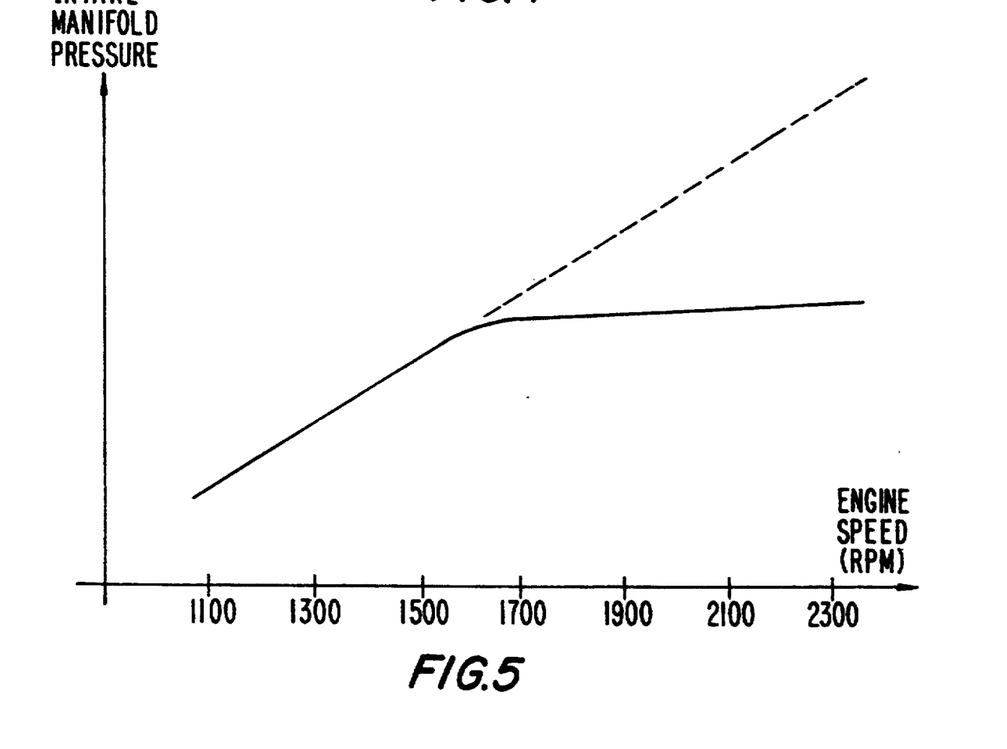
Figure 6:
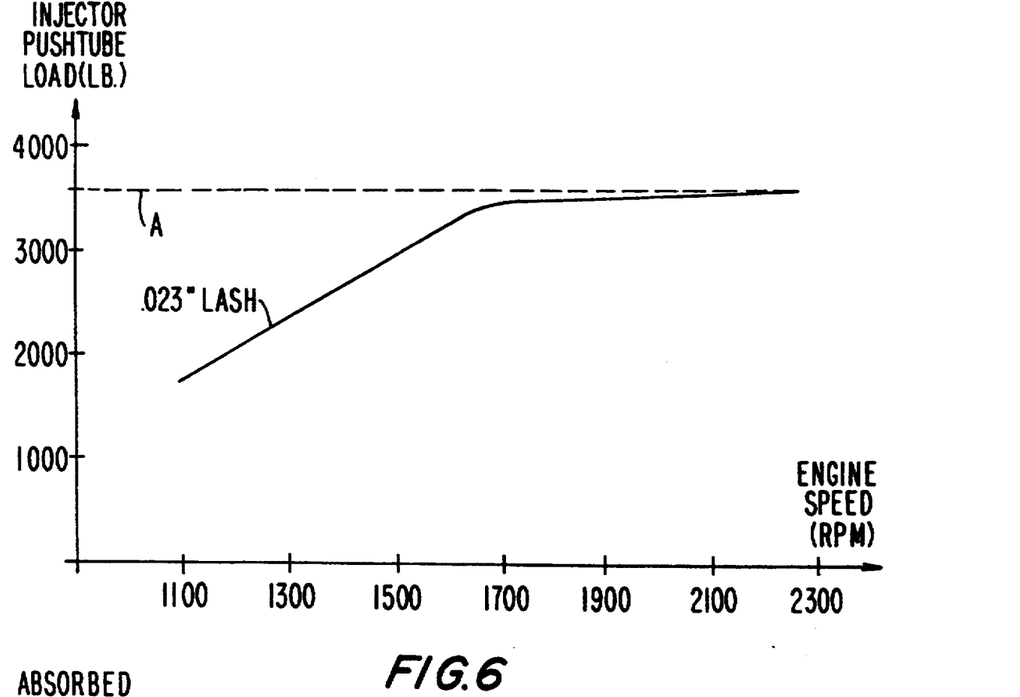

At engine speeds above about 1500 RPM, flow restrictor 40 is closed to the extent required to produce the appropriate backpressure shown for that engine speed in FIG. 4. For example, if engine speed (as sensed by pressure sensor 50) is 1700 RPM, flow restrictor 40 is closed to the extent required to produce a backpressure on turbine 30a of approximately 4 psi. If engine speed is 2100 RPM, flow restrictor 40 is closed to the extent required to produce a backpressure on turbine 30a of approximately 6 psi. (It will be understood that the particular pressures and pressure profile shown in FIG. 4 are merely exemplary and that other systems may require other pressures and/or other pressure profiles.) The effect of this backpressure is to significantly reduce the speed of turbine 30a from what it would be without this backpressure. This in turn reduces the increase in intake manifold pressure and engine cylinder pressure produced by turbocharger pump 30b (compare the solid line intake manifold pressure profile in FIG. 5 to the conventional dotted line profile in that FIG.). For each engine speed that would otherwise cause a stress limit to be exceeded, flow restrictor 40 is controlled to produce the amount of backpressure required to prevent that stress limit from being exceeded. Thus, as shown in FIG. 6, the effect of flow restrictor 40, controlled as described above, is to prevent the fuel injector pushtube load from exceeding limit A even when engine brake 24 has a 0.023 inch lash setting and engine speed is relatively high.

Figure 7:
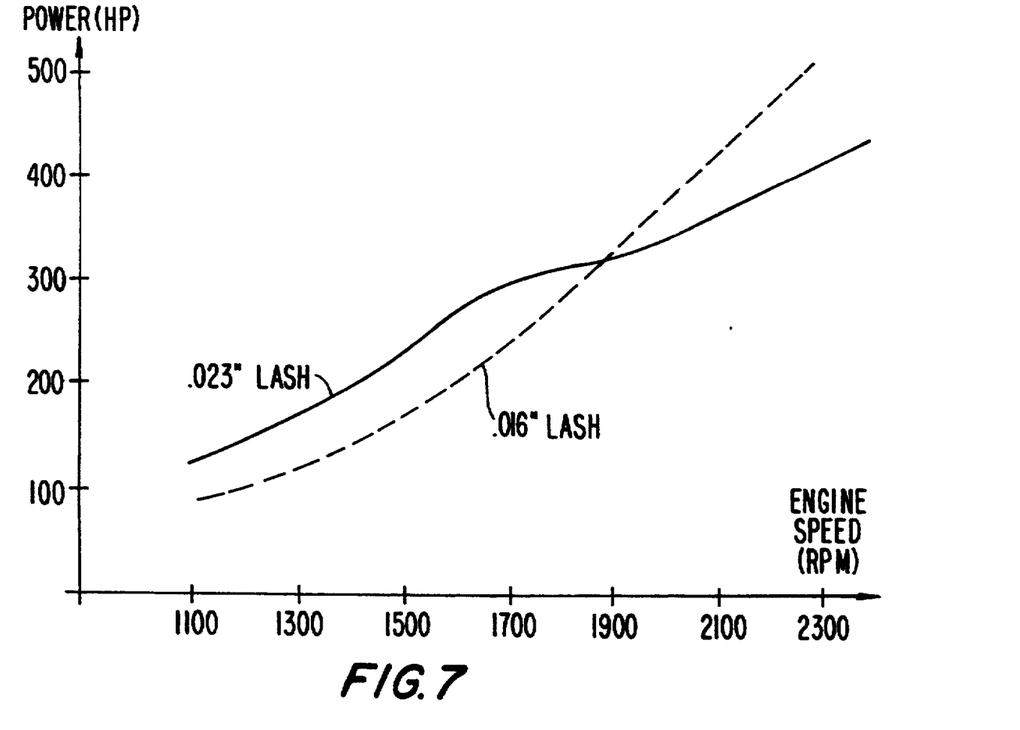

FIG. 7 shows the effect of the above-described operation of flow restrictor 40 on the engine braking available from the system with engine brake 24 set with a 0.023 inch lash. (The 0.016 inch lash curve from FIG. 3 is repeated in FIG. 7 as a broken line for comparison.) At low and moderate engine speeds substantially more engine braking is produced than would be available if a 0.016 inch lash setting were used. At higher engine speeds, when flow restrictor 40 begins to have a significant effect on the performance of turbocharger 30, the 0.023 inch lash horsepower curve begins to fall below what it would be without flow restrictor 40 (compare the upper end of the 0.023 inch lash curve in FIG. 3). At even higher engine speeds (e.g., above about 1900 RPM) the 0.023 inch lash curve in FIG. 7 may even be below the 0.016 inch lash curve from FIG. 3. However, the modern emphasis on operating engines as much as possible at lower speeds (e.g., for better fuel economy and longer life) makes it acceptable to sacrifice some engine braking horsepower at high engine speeds in order to increase engine braking horsepower at low and moderate engine speeds. For driving stability, however, it is preferred that engine braking horsepower continue to increase with increased engine speed throughout the entire speed range of the engine. The 0.023 inch lash curve shown in FIG. 7 has this preferred characteristic.

Figure 8:
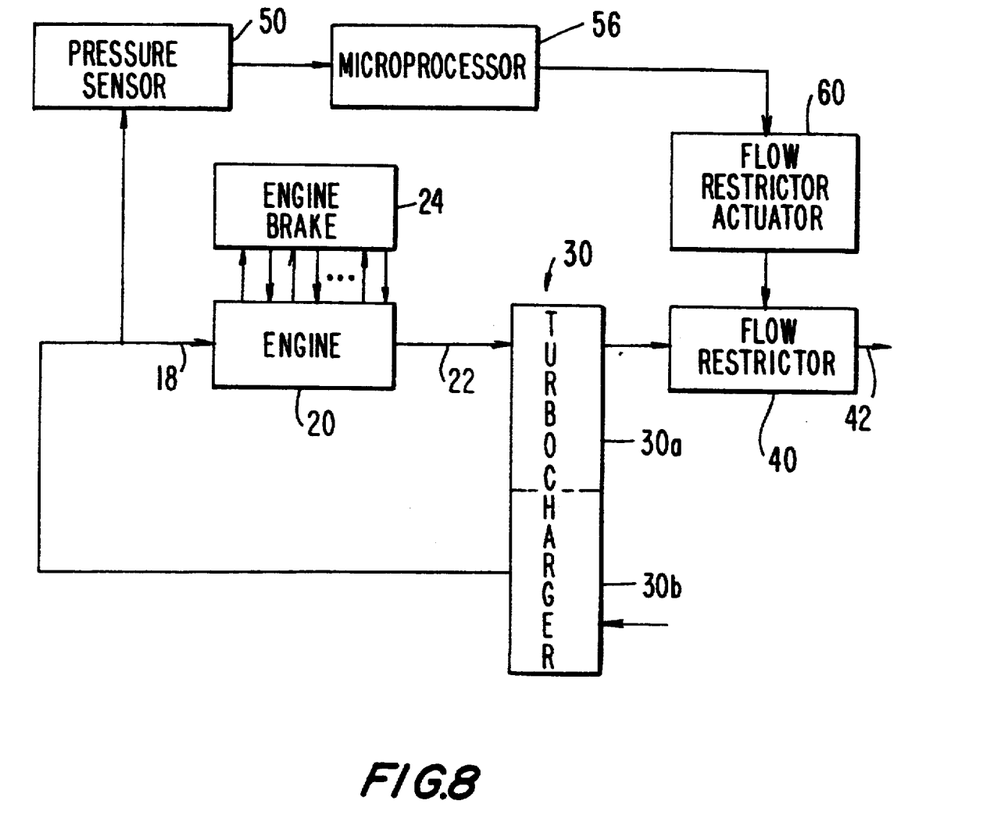
FIG. 8 is a block diagram similar to FIG. 1 showing an alternative embodiment of the invention.

As FIG. 4 suggests, flow restrictor 40 may be required to respond in a fairly complex fashion to different engine speeds. The necessary flow restrictor response may be achievable with the relatively simple feedback loop 50, 52, and 60 shown in FIG. 1, or it may be preferred to employ a microprocessor 56 in the feedback loop as shown in FIG. 8. Microprocessor 56 may function as a look-up table, i.e., responding to the value of the pressure sensor output signal by looking up in a memory an appropriate corresponding value for application to actuator 60 to produce the amount of closure of flow restrictor 40 required to cause a desired backpressure on turbine 30a. Alternatively, microprocessor 56 may use a previously stored algorithm to calculate the value to be applied to actuator 60 in response to the value of the output of pressure sensor 50.

Figure 9:
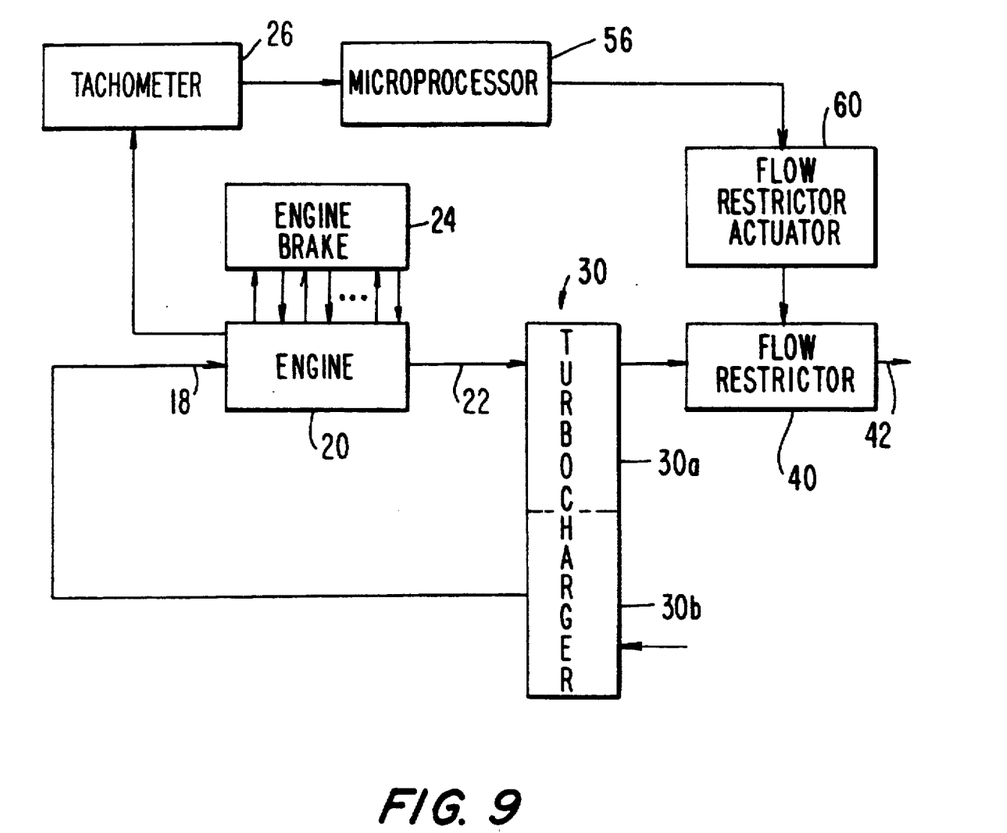
FIG. 9 is a block diagram similar to FIG. 1 showing another alternative embodiment of the invention.
Figure 10:
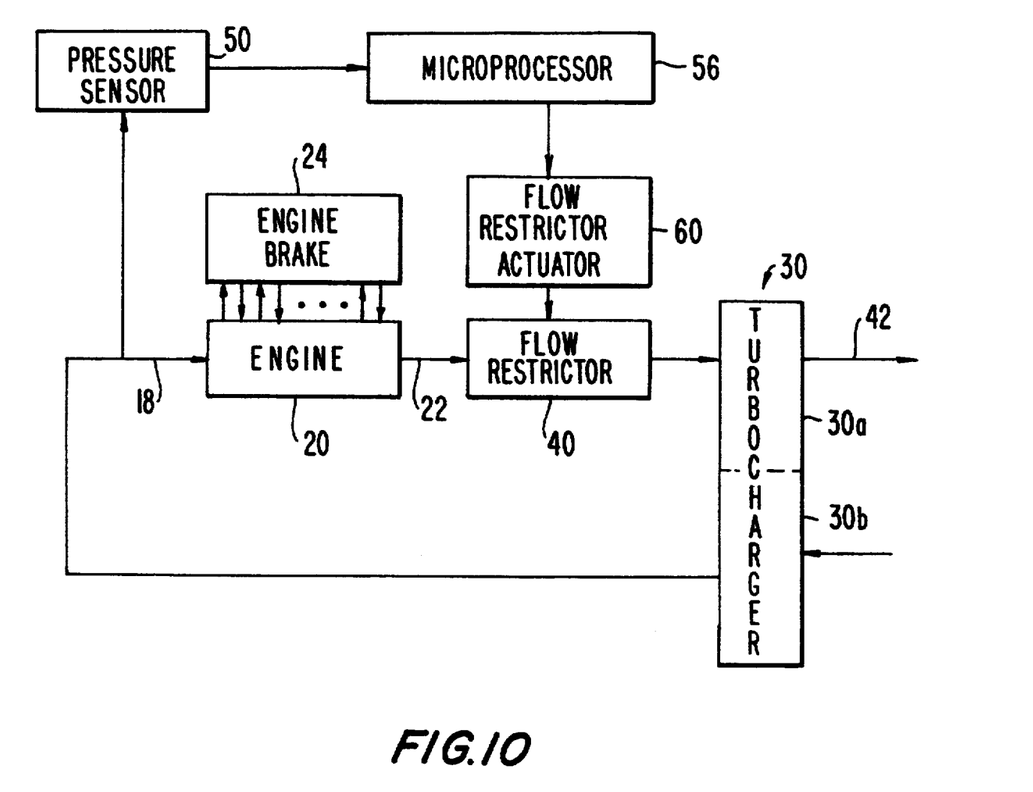
FIG. 10 is a block diagram similar to FIG. 1 showing yet another alternative embodiment of the invention.
Figure 11:
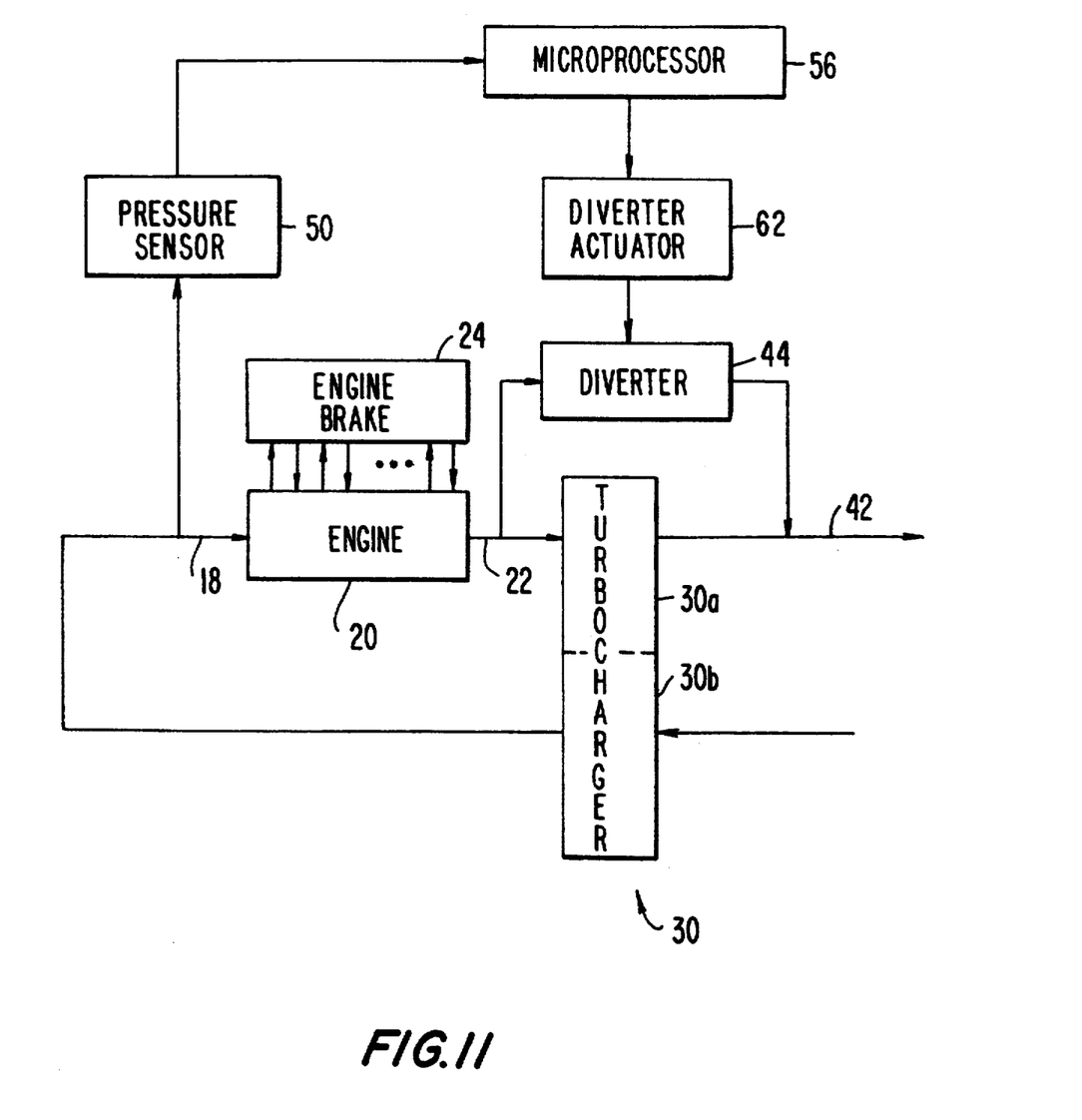
FIG. 11 is a block diagram similar to FIG. 1 showing still another alternative embodiment of the invention.

Other alternative embodiments of the invention are shown in FIGS. 9-11. In FIG. 9 engine speed is monitored directly (e.g., by engine tachometer 26) instead of indirectly by monitoring intake manifold pressure as in FIGS. 1 and 8.

There are also alternatives to using a flow restrictor downstream from turbine 30a to modify the performance of turbocharger 30. For example, FIG. 10 shows the alternative of placing flow restrictor 40 upstream from turbine 30a. In FIG. 11 diverter 44 can be opened by diverter actuator 62 to allow some of the engine exhaust gas to bypass turbine 30a when it is desired to slow down turbocharger 30. Diverter 44 may be a butterfly valve or a gate valve device similar to above-described flow restrictor 40, except that diverter 44 is opened rather than partly closed when it is desired to slow down the turbocharger.

It will be understood that the foregoing is only illustrative of the principles of this invention, and that various modifications can be made by those skilled in the art without departing from the scope and spirit of the invention. For example, although in the depicted embodiments fuel injector pushtube stress is the limiting load consideration, in other embodiments other factors may be the limiting constraint. As another example of possible modifications, a comparator 52 of the type shown in FIG. 1 can be substituted for the microprocessor 56 in any of the other embodiments, or any equivalent electrical, mechanical, or electromechanical device or devices can be substituted for elements 52 or 56 and the other components associated with those elements.

The Invention claimed Is:

1. In the operation of a compression release engine braking system which includes a turbocharged internal combustion engine and a selectively operable compression release engine brake for opening at least one exhaust valve in the engine near top dead center of the compression stroke of the engine piston in the engine cylinder served by that exhaust valve during operation of said engine brake, the method of reducing the pressure of the gas in said cylinder against which said engine brake must open said exhaust valve when said engine is turning at relatively high speed during operation of said engine brake in order to reduce the force that the engine brake must apply to said engine to open said exhaust valve during operation of said engine brake at said high engine speed, said method comprising the steps of:

monitoring a characteristic of the engine which is indicative of engine speed during operation of said engine brake in order to produce a monitored value of said characteristic;

comparing said monitored value to a predetermined value of said characteristic which corresponds to an engine speed above which the pressure of the gas in said cylinder against which said engine brake must open said exhaust valve tends to become undesirably high and the force which said engine brake must exert on said engine to open said exhaust valve also tends to become undesirably high in order to produce an output indication when said monitored value exceeds said predetermined value during operation of said engine brake; and reducing the exhaust gas pressure gradient across the turbocharger by operating on the exhaust gas exiting from said engine during production of said output indication, the reduction in exhaust gas pressure gradient across the turbocharger decreasing turbocharger speed and thereby decreasing the pressure of the gas in said cylinder against which said engine brake must open said exhaust valve during operation of said engine brake and the force which said engine brake must exert on said engine to open said exhaust valve.

2. The method defined in claim 1 wherein said reducing step comprises the step of:

restricting the flow of engine exhaust gas through the turbine of the turbocharger.

3. The method defined in claim 2 wherein said restricting step comprises the step of:

restricting the flow of engine exhaust gas exiting from the turbine of the turbocharger.

4. The method defined in claim 2 wherein said restricting step comprises the step of:

restricting the flow of engine exhaust gas from the engine to the turbine of the turbocharger.

5. The method defined in claim 1 wherein said reducing step comprises the step of:

allowing a portion of the engine exhaust gas to bypass the turbine of the turbocharger.

6. The method defined in claim 1 wherein said monitoring step comprises the step of:

monitoring the pressure of the gas in said intake manifold.

7. The method defined in claim 1 wherein said monitoring step comprises the step of:

monitoring the speed of the engine.

* * * * *